May 1, 1928.
C. H. HAPGOOD
1,667,890
INDICATING DEVICE
Filed Nov. 10, 1923
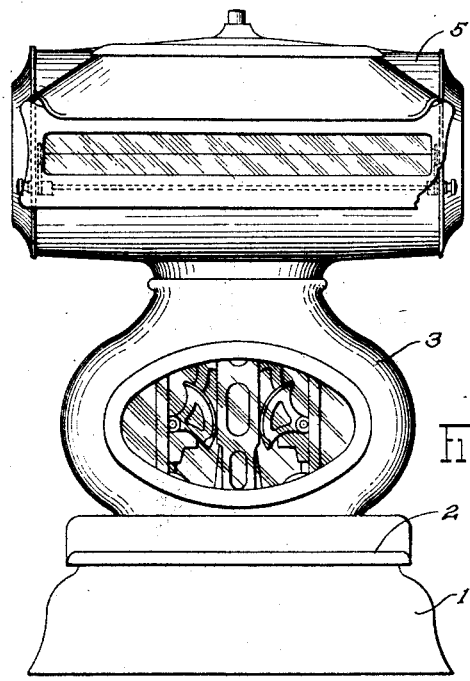
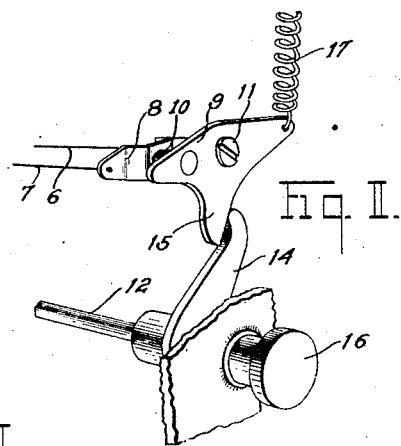
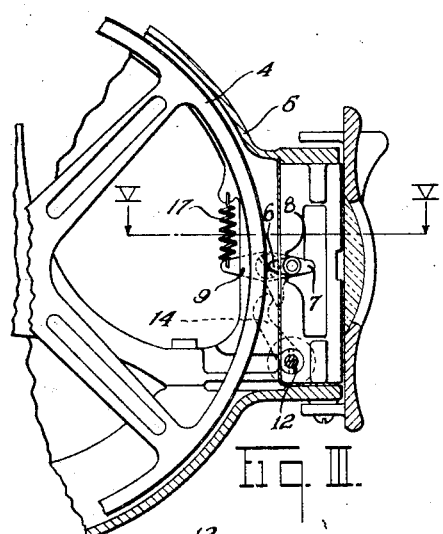
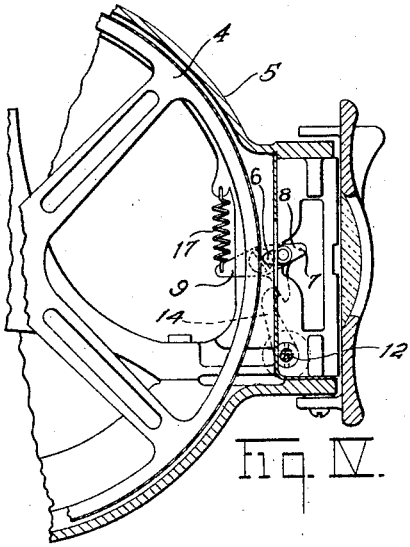
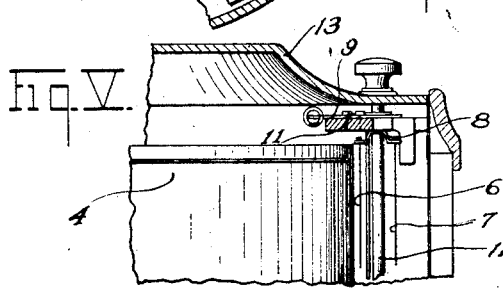
Inventor
Clarence H. Hapgood
By C. O. Marshall
Attorney Patented May 1, 1928.

1,667,890

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

INDICATING DEVICE.

Application filed November 10, 1923. Serial No. 674,093.

This invention relates to indicating devices, and particularly to indicators for weighing scales, and it is especially adapted for use with scales having indicators of the so-called cylinder type, although it is to be understood that its application to other types of indicators is within the ambit of my invention.

Indicating devices as applied to automatic computing weighing scales usually consist of charts bearing series of computations and indices which indicate the particular computations to be read. Since the chart and index in a scale of this kind must be relatively movable and the index must at all times remain out of contact with the chart, the index and chart are usually spaced a small fraction of an inch apart and the particular figure or graduation on the chart with which the index is in apparent registration depends upon the position of the observer.

Indices have been constructed consisting of pairs of parallel reading lines similar to those shown in the patent to Mingle No. 1,237,365, for the purpose of avoiding errors due to parallax. The observer, however, if a short man, must stretch, and if a tall man, must stoop in order to bring his eye in the plane of the reading wires to obtain a correct reading of the scale.

One of the salient objects of my invention is to provide an index for scales consisting of a pair of parallel reading lines which may be adjusted to suit the eye of the observer, whether he be tall or short, to relieve him of the inconvenience of stooping or stretching.

A further object is to provide an index for scale charts which may be readily and easily adjusted without disassembling any of the scale parts.

Still another object is the provision of an index and sighting device which may be adjusted to various positions to accommodate various sizes of persons, the readings obtained in the various positions being identical.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale of well known type showing the application of my invention thereto;

Fig. II is a fragmentary perspective view of the elements comprising my invention;

Figure III is a fragmentary sectional view through the scale chart and housing incorporating my invention;

Figure IV is a view similar to Figure III showing the index in a shifted position; and Figure V is a fragmentary sectional view taken on the line V—V of Figure III.

Referring to the drawings in detail, I have shown my invention as applied to a weighing scale of the type embodying a cylindrical chart, but it is to be understood that my invention is applicable for use with any type of chart or graduated member. The scale consists of a base 1 containing platform lever mechanism (not shown) supporting a commodity-receiving platform 2, the platform levers being connected to a load-offsetting means, more particularly described in Patent No. 1,203,611, to Hapgood, comprising a pair of pendulums mounted within an upright housing 3, which is supported upon one end of the base 1. A load placed upon the platform 2 is transmitted through the platform lever mechanism to the pendulums, causing them to swing outwardly and upwardly to counterbalance the load, simultaneously actuating an indicating member or cylinder 4 by means of rack and pinion mechanism (not shown), the indicating cylinder being mounted in a suitable housing 5 supported upon the upper portion of the upright housing 3.

The indicating cylinder bears suitable weight and price indicia which, when brought into registration with a reading index placed in juxtaposition thereto, provides an easy method of ascertaining the desired computation.

In addition to the index wire 6 I have provided another wire 7 for the purpose of obviating any errors in reading the computations due to parallax, the two wires forming a sighting index as they do in the above-mentioned patent to Mingle. It is to be understood, however, that another form of sighting index, such, for example, as a ribbon, may be employed in lieu of the wires 6 and 7 to accomplish the same purpose. Both wires are secured at their ends to brackets 8, preferably constructed in V shape, the bights of the V-shaped brackets being fixedly secured to the arms 9 through the medium of the studs 10, the inherent resiliency in the wings of the brackets serving to retain the wires in a continued state of tension. The arms 9 to which the brackets 8 are secured are pivoted upon screws 11, the axes of which are positioned coincident with a line upon the surface of the chart 4 and in parallelism therewith.

Positioned parallel with the chart 4 and within the housing 5 is a shaft 12 journaled in apertures in the housing end plates 13, and fixedly positioned upon said shaft at either end of the chart 4 are the fingers 14 which contact with depending portions 15 of the arms 9. Contractile springs 17 secured to the ends of the arms 9 resiliently retain the arms and fingers 14 in contact.

Fixedly secured to either extremity of the shaft 12 exteriorly of the housing end plates 13 are the knobs 16 to facilitate adjustment. Enough friction is set up between the shaft 12 and its journals to overcome the contractile force of the springs to retain the mechanism in any adjusted position.

As has been previously stated, the axes of the screws 11 upon which are pivoted the arms 9 being coincident with an imaginary line upon the face of the chart, it will readily appear that if the arms 9 are partially rotated upon the screws 11 by means of the shaft 12 and the fingers 14 that a plane passing through the wires 6 and 7 would be rotated about this line as its axis. When the eye of the observer is in this imaginary plane, the wires apparently blend into a reading index having the thickness of one wire, and the line of computations in visual coincidence with this reading index always remains the same, regardless of the position of the arms 9 and the consequent change in the plane of the reading and sighting wires.

It will be readily understood from the foregoing description that the index and sighting wires may be shifted to suit the eye of the observer, whether he be tall or short, without causing him unnecessary inconvenience or fatigue.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a movable chart, reading and sighting indices co-operating therewith, a pivotal support for said reading and sighting indices, the pivotal axis of said support lying in the plane of the surface of said chart, and means for adjusting said support about its pivotal axis.

2. In a device of the class described, in combination, a movable chart, linear reading and sighting indices, resilient means for tensioning said indices, and means for partially rotating said indices such that the axis of rotation of a plane passing through said indices will be a fixed line upon the chart.

3. In a device of the class described, in combination, a movable cylindrical chart, reading and sighting indices lying parallel with the axis of said chart, resilient means for tensioning said indices, means for supporting said tensioning means, and manually-operated means for partially rotating said supporting means, including said indices, the axis of rotation of a plane passing through the reading and sighting indices being a fixed line upon the face of the chart.

4. In a device of the class described, in combination, a housing, a cylindrical chart rotatably mounted in said housing, reading and sighting indices positioned parallel with the axis of said chart, a support for said indices, and means extending to the exterior of said housing for adjusting said support.

5. In a device of the class described, in combination, a relatively movable chart and sighting index, a pivotal support for said index, the pivotal axis of said support lying in the plane of said chart and coinciding with a line to be indicated by said index, and means for adjusting said support about its pivotal axis.

CLARENCE H. HAPGOOD.